United States Patent [19]

Pangman

[11] Patent Number: 5,277,158
[45] Date of Patent: Jan. 11, 1994

[54] MULTIPLE VANE ROTARY INTERNAL COMBUSTION ENGINE

[75] Inventor: Edwin L. Pangman, Bountiful, Utah

[73] Assignee: Pangman Propulsion Company, Bountiful, Utah

[21] Appl. No.: 825,612

[22] Filed: Jan. 24, 1992

[51] Int. Cl.⁵ .......................................... F02B 53/00
[52] U.S. Cl. ................................... 123/243; 418/261
[58] Field of Search ............... 123/203, 243; 418/94, 418/261

[56] References Cited

U.S. PATENT DOCUMENTS

| | | | |
|---|---|---|---|
| 2,864,346 | 12/1958 | Taylor | 123/243 X |
| 3,301,233 | 1/1967 | Dotto et al. | |
| 3,461,849 | 8/1969 | Kelly . | |
| 3,464,395 | 9/1969 | Kelly . | |
| 3,548,790 | 12/1970 | Pitts . | |
| 3,637,332 | 1/1972 | McAnally | 418/159 |
| 3,747,573 | 7/1973 | Foster . | |
| 3,809,020 | 5/1974 | Takitani . | |
| 3,822,676 | 7/1974 | Richter | 418/94 X |
| 3,929,105 | 12/1975 | Chisholm . | |
| 3,970,051 | 7/1976 | Kirkman . | |
| 4,018,191 | 4/1977 | Lloyd . | |
| 4,106,472 | 8/1978 | Rusk | 123/205 |
| 4,202,213 | 5/1980 | Rosaen | 123/212 |
| 4,230,088 | 10/1980 | Southard | 123/203 |
| 4,241,713 | 12/1980 | Crutchfield | 123/202 |
| 4,353,337 | 10/1982 | Rosaen | 123/243 |
| 4,418,663 | 12/1983 | Bentley | 123/243 |

FOREIGN PATENT DOCUMENTS

| | | | |
|---|---|---|---|
| 572294 | 2/1924 | France | 123/243 |
| 1002431 | 10/1951 | France | 123/243 |
| 80040 | 1/1963 | France | 123/243 |
| 106327 | 5/1988 | Japan | 123/243 |
| 584155 | 1/1947 | United Kingdom | 123/243 |

Primary Examiner—Michael Koczo
Attorney, Agent, or Firm—Workman, Nydegger & Jensen

[57] ABSTRACT

A three-piece housing enclosing a cavity has rotatably mounted therein a rotor having a plurality of slots, each slot supporting a vane. Each vane has a retention end guided in its revolution around the rotor by an internal, non-circular vane retention track. Two adjacent vanes define opposite sides of a combustion chamber, while the housing and the portion of the rotor between the adjacent vanes form the remaining surfaces of the combustion chamber. Each combustion chamber is rotated past an intake port, a diagonal plasma bleed-over groove, and an exhaust port to accomplish the phases of a combustion cycle. Fuel ignition is provided to more than one combustion chamber at a time by expanding gases passing through a plasma bleed-over groove and being formed into a vortex that ignites and churns the charge in a succeeding combustion chamber. Exhaust gases remaining after primary evacuation are removed by a secondary evacuation system utilizing a venturi creating negative pressure which evacuates the combustion chamber. Lubrication is circulated through the engine without the use of a lubricant pump. The centrifugal force of the rotating rotor causes the lubricant therein to be pressurized thereby drawing additional lubricant into the closed system and forcing lubricant within the engine to be circulated.

17 Claims, 11 Drawing Sheets

MULTIPLE VANE ROTARY INTERNAL COMBUSTION ENGINE

BACKGROUND

1. Field of the Invention

The present invention relates to internal combustion engines, and more particularly to a multiple vane rotary internal combustion engine.

2. Background Art

A. Reciprocating Piston Engines

The internal combustion engine has been used in many applications since its introduction. Today, the most commercially successful version of the internal combustion engine utilizes pistons secured at one end to a crankshaft, rotation of which reciprocates the pistons within cylinders. While the reciprocating version of the internal combustion engine is fraught with disadvantages when compared to other versions of the internal combustion engine, years of research and development have been expended making the reciprocating piston engine more reliable and efficient.

The efficiency of any internal combustion engine depends on how completely the fuel is combusted within the engine. Combustion is accomplished using either a two-phase or four-phase combustion cycle. While recent advances have been made in two-phase engines, the vast majority of modern engines utilize the four-phase combustion cycle.

The events occurring during the four phase combustion cycle include:

1) Intake Phase

During the intake phase, a charge of an air and fuel mixture is drawn into a combustion chamber;

2) Compression Phase

The charge is compressed to a point of optimal volume; and ignited during the latter part of the Compression Phase of the cycle to initiate combustion of the fuel and air mixture and to cause an increase in the temperature and pressure of gases in the charge;

3) Power or Work Phase

The mechanical power is created by harnessing the work produced by the expanding gases of combustion to propel a piston or rotor; and 4) Exhaust Phase Spent gases and products of combustion are exhausted from the combustion chambers.

The efficiency of the four-phase combustion cycle is influenced by many factors: (a) the temperature of the combustion chamber and relative temperature of the intake charge; (b) the compression ratio; (c) the efficiency of the ignition system; and (d) most of all by the speed of the engine as measured in revolutions per minute (RPM).

All reciprocating piston engines have an optimal speed of operation. While this speed may be maintained for long periods in industrial, commercial, or aircraft applications, most other applications require that the engine be operated at varying speeds.

At speeds below the optimal operating speed of the engine, combustion is inefficient, but no immediate detrimental effects are usually exhibited by the engine.

As the speed of reciprocating piston engines increases past the point of optimal efficiency, however, the air and fuel mixture may not totally combust during the recurring power phases and may actually continue to burn into the exhaust phase. This results in the familiar phenomenon commonly referred to as an exhaust "backfire." The continued expansion of burning gases in combination with unburned fuel in the exhaust phase may also cause less than optimal evacuation of the spent products of combustion.

When the intake phase is initiated following an ineffective exhaust phase, the remaining unburned gases in the combustion chamber left over from the previous exhaust phase may cause entering gases to be displaced, thereby causing a less than optimal charge from being drawn into the combustion chamber. This less than optimal incoming charge may even ignite prematurely during the intake and compression phases of combustion due to the residual products of combustion.

If the incoming charge is ignited in the intake phase, the charge will undergo combustion resulting in an intake backfire through the intake port and induction system. If the incoming charge ignites during the compression phase of combustion, the premature ignition causes expansion of the gases in the combustion chamber. The mechanical energy required to compress expanding gases is naturally greater than the energy required to compress gases at atmospheric pressure. The resultant increase in needed energy to compress the air and fuel mixture introduces drag on the engine which reduces efficiency and may actually halt the rotation of the engine.

The inefficient combustion of the air and fuel mixture at high engine speeds may also be exacerbated by the ignition system. At high engine speeds, the number of sparks per minute that are needed to ignite the charges in the combustion chambers often tax the ignition system to the point where the spark becomes weak.

When the engine speed exceeds the ability of the ignition system to deliver a spark of suitable strength, complete combustion of the charge is delayed until late in the work phase and may not occur before the charge is evacuated during the exhaust phase. This results in both the presence of unburned fuel in the exhaust system, causing backfires, and in the presence of rapidly expanding partially burned and burning fuel remaining in the combustion chamber. The incoming charge of air and fuel is met by the expanding gases remaining in the combustion chambers resulting in less charge being taken into the combustion chamber than a totally evacuated combustion chamber thereby decreasing the efficiency of the engine.

To improve the strength of the spark provided to the air and fuel charge in the combustion chamber, complex multiple discharge and multiple-coiled ignition systems have been developed. These systems benefit the combustion cycle by providing a stronger spark to each combustion chamber. An advantage of multiple spark systems is that combustion is initiated simultaneously at several points within the combustion chamber. This increases both the speed and the thoroughness of combustion.

While these complex ignition systems often substantially improve the efficiency of the spark provided at high engine speeds, the complexity of these ignition systems often results in unreliability and frequent maintenance. Their presence also limits the space available for intake and exhaust valves, thereby decreasing the efficiency of the intake or exhaust phases of the combustion cycle.

Ignition systems work in conjunction with compression ratios to limit the types of fuel and the range of fuel and air mixtures that may be combusted in an engine.

For example, engines which burn less volatile fuels, such as diesel fuel utilize a compression ratio so high as to require no spark. Ignition is accomplished through the introduction of fuel in an atomized stream into the highly compressed, hot air. The flame spreads across the charge in the combustion chamber, requiring more time to combust than with more volatile fuels, such as gasoline, but nevertheless producing a more smooth explosion with less shock to the engine.

Likewise, fuels that are more volatile than gasoline such as hydrogen must utilize a relatively low compression ratio or risk premature ignition when the charge is compressed to the same volumes as gasoline-based charges. For this reason, more ecologically desirable fuels with high volatilities cannot be burned in gasoline-based reciprocating piston engines without incurring the risk of damage to the engine. Considerable modification of the compression ratios and induction systems of gasoline-based engines is usually required before fuels such as hydrogen can be burned reliably.

Reciprocating piston engines are susceptible to damage from the use of more volatile fuels because of the reciprocating nature of the engine. The force produced by combustion of very volatile fuels tends to push the piston out the bottom of the engine before the crankshaft can reverse the direction of travel of the piston. This reversal process is the cause of much of the shock and vibration associated with reciprocating piston engines. Repeated exposure to these shocks can substantially decrease the life of the engine.

Reciprocating piston engines must reverse the direction of the piston upon completion of each phase of the combustion cycle. This reversal imposes a limit on the maximum engine speed attainable. To enable sufficient speed for an engine to be usable, the weight of the reciprocating mass of the piston and connecting rod must be kept low. At the same time the strength of the connecting rod between the reciprocating pistons and the crankshaft must be sufficient to overcome the shock and vibration of constant reciprocation of the piston within the cylinder. These shocks are compounded in reciprocating piston engines by the number of pistons, the speed of the engine, and the orientation of the cylinders within the engine. Many of the advances in reciprocating piston engines have centered on overcoming these inherent vibration problems by attempting to balance the vibrations with counter-balance shafts and by reorienting the cylinders into different configurations.

B. Wankel Rotary Engines

In an attempt to devise an internal combustion engine that does not exhibit the static and dynamic balancing problems associated with reciprocating piston engines, rotary engines have been developed. Rotary engines generally exhibit an increased power-to-weight ratio due to a reduction of friction and an increase in efficiency derived from the rotary action of the engine.

The Wankel engine is one type of a rotary engine. A Wankel engine has a generally triangularly shaped trochoidal rotor and a rotor chamber housing having its inner wall configured to conform to the oscillations of the trochoidal rotor. The rotor housing is configured to place the three lobes of the rotor in constant engagement with the inner wall of the rotor chamber housing This constant engagement causes relatively rapid wear on the lobes and housing. Many of the recent advances in the Wankel engine focus on the improvement of the seals between the rotor lobes and the inner wall of the rotor housing.

The intake and exhaust valves and the sparkplug need to be centrally located in the combustion chamber of all internal combustion engines for optimal efficiency. Compromises in either intake and exhaust valve placement or in sparkplug location must be accepted, however, because of space constraints within the cylinders of reciprocating piston engines. These compromises have led to less than optimal combustion taking place in most reciprocating engines. Because of these inherent weaknesses, much of the research and development occurring on behalf of reciprocating engines has been directed at these problems. The recent influx of multiple valve engines and dual sparkplug cylinder heads on the market bears record of the results of this research. Even multiple valve engines, however, do not totally overcome the problems associated with the arrangement of the valves and sparkplug within the combustion chamber of reciprocating piston engines.

Rotary engines, however, do not share the same inherent weaknesses in combustion chamber design. Most rotary engines in effect rotate each combustion chamber past the intake port prior to ignition. This results in the freedom to locate the intake port at the optimal location for combustion chamber filling, without regard to interference from the exhaust valve or ignition system. Thereafter, each combustion chamber is rotated past the sparkplug, which can similarly be optimally located. The rotary arrangement thereby avoids the need to have an intake or exhaust valve physically enter the combustion chamber and therefore, dispenses with complicated valve train components and their inherent unreliability and complexity.

Other advantages of rotary engines over reciprocating piston engines include the following: more convenient internal cooling of the rotor; higher compression ratios permissible without engine knocking owing to combustion chamber arrangement; a low size-to-power output ratio; fewer moving parts; and operation with decreased noise and vibration.

Despite the aforementioned advantages of rotary engines, the reciprocating engine continues to enjoy widespread use in the automotive industry because it provides high pressure sealing by the simple and reliable usage of sprung rings obstructing the blow-by of gases between the piston and cylinder wall.

In a Wankel type rotary engine, such sprung rings are replaced by seals between the epitrochoidal rotor and the housing. Because the rotor lobe apex is in constant contact with the inner wall of the housing, an apex seal must retain a sealing interface throughout the rotor's epitrochoidal revolutions The working face of this apex seal must tolerate thrusts over a wide range of angles relative to the inner wall as its approach to the work varies from thrust to drag two times for each revolution of the rotor. The need to maintain constant contact limits the inherent dynamic balance available to rotary engines because of the high specific bearing pressure exerted by the apex seal on the inner wall of the housing.

A reciprocating piston engine utilizes only the upper surface of the cylindrical piston to produce work. In contrast to a reciprocating piston engine with only one working surface, the three outside faces of an epitrochoidal rotor provide extensive operating surfaces which are constantly deployed in useful processes. In the reciprocating internal combustion engine using a four-phase combustion cycle, the crankshaft must revolve two times to recover the beginning attitude in preparation for another cycle. This produces one power stroke per two revolutions of the crankshaft. Epitrochoidal rotary engines, however, obtain one power stroke per revolution.

Epitrochoidal Wankel engines utilize the same four phase combustion cycle discussed above. Because of the higher speeds attainable with engines that do not reciprocate, there is a higher probability that rotary engines will operate at speeds greater than the optimal speed for combustion of the charge within the combustion chamber. Although the more efficient placement of intake and exhaust ports and sparkplugs increases the efficiency of the rotary engine, the reduction in friction elevates the maximum engine speed beyond the capacities of even the improved ignition and induction systems.

C. Vaned Rotary Engines

Another type of rotary engine designed to overcome the disadvantages of reciprocating piston engines is the vaned rotary engine. Rather than using a trochoidal rotor, the typical vaned rotary engine utilizes a circular rotor carried eccentrically within a fixed housing which defines a rotor chamber. The periphery of the rotor is usually divided by radially extensible and retractable vanes. Each combustion chamber is defined between a pair of successive vanes, a portion of the rotor therebetween, and the rotor housing enclosing the chamber. As the combustion chamber revolves around the inside of the housing, the plural combustion chambers continuously change in volume due to the eccentric rotation of the rotor.

The phases of the combustion cycle are accomplished by positioning the intake and exhaust ports at advantageous locations within the rotor housing,. As the combustion chamber expands and contracts, the changing volume serves to drawn in and expel gases.

The radially spaced movable vanes are arranged in increments about the periphery of the rotor. The tips of these vanes typically must form a tight seal with the inner wall of the rotor housing to sealingly divide the rotating combustion chambers from each other. This separation prevents the various phases of the combustion process from overlapping and interfering with subsequent phases.

As with Wankel engines, however, rapid wear of the seals occurs between the vane tips and the inner wall of the rotor housing.

As the speed of a vane-type rotary engine increases, the vanes tend to elongate and contact the inner surface of the housing with greater pressure. This elongation expedites wear on the housing and precipitates early degradation of the housing.

A further problem associated with both reciprocating and rotary engines occurs because of the dependency of these engines on a lubricant pump to pressurize and circulate lubricant to the friction surfaces of the engine. A malfunction in the lubricant pump precipitates rapid engine degradation leading to eventual destruction of the engine. As a result, the useful life of the engine depends on the proper functioning of the lubricant pump.

It would, therefore, be an advancement in the art to provide an internal combustion engine that is free from reliance on a lubricant pump to pressurize and circulate lubricant throughout the engine.

Another advancement in the art would be to provide an internal combustion rotary engine that does not wear rapidly at the point of interface between the rotor or vanes and the inner wall of the rotor housing.

Still another advancement in the art would be to provide an internal combustion engine that is capable of using a variety of fuels having volatilities greater than gasoline, while retaining the ability to operate when fueled by gasoline.

Yet another advancement in the art would be to provide an internal combustion engine that becomes more efficient at high engine speeds. A further advancement in the art would be to provide an internal combustion engine that does not suffer from incomplete exhaust scavenging during high engine speeds.

A still further advancement in the art would be to provide an internal combustion engine that has a simplified and reliable ignition system.

Another advancement in the art would be to provide an internal combustion engine that does not suffer from a weak spark during high engine speeds.

Yet another advancement in the art would be to provide an internal combustion engine that is free of the vibrations incurred from reciprocating pistons.

Still another advancement in the art would be to provide an internal combustion engine that is free of the imbalances and stresses imposed by reciprocating pistons.

OBJECTS AND BRIEF SUMMARY OF THE INVENTION

It is, therefore, an object of the present invention to provide an internal combustion engine that is free from reliance on a lubricant pump to pressurize and circulate lubricant throughout the engine.

Another object of the present invention is to provide an internal combustion rotary engine that does not wear rapidly at the point of interface between the rotor vanes and the inner wall of the rotor housing.

Yet another object of the present invention is to provide an internal combustion engine that is capable of using a variety of fuels.

Still another object of the present invention is to provide an internal combustion engine that becomes more efficient at high engine speeds.

A further object of the present invention is to provide an internal combustion engine that does not suffer from incomplete exhaust scavenging during high engine speeds.

A still further object of the present invention is to provide an internal combustion engine that has a simplified and reliable ignition system.

Another object of the present invention is to provide an internal combustion engine that does not suffer from a weak spark during high engine speeds.

Yet another object of the present invention is to provide an internal combustion engine that is free of the vibrations incurred from reciprocating pistons.

A further object of the present invention is to provide an internal combustion engine that is free of the imbalances and stresses imposed by reciprocating pistons.

Additional objects and advantages of the invention will be set forth in the description which follows, and in part will be obvious from the summary and detailed description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein a multiple vane, rotary, internal combustion engine is provided with a housing enclosing a cavity. In one preferred embodiment, the cavity is elliptical. In another preferred embodiment, the housing is quaternary. In both preferred embodiments the housing comprises an internal non-circular vane retention housing member, a central housing member, and two outer housing members capable of being sealingly combined to enclose the cavity. The housing provides for the intake and exhaust of the products of combustion through intake and exhaust ports penetrating a wall of the outer housing member.

A rotor is rotatably mounted within the housing with a plurality of circumferentially-spaced, radially-extending slots being formed in the rotor between a plurality of vane guides. A plurality of vanes having retention ends and working ends are slidably supported in the slots.

Means for guiding the vanes in a non-circular pathway formed in the housing pivotally retain the retention ends of the plurality of vanes in a non-circular path of travel as combustion in the combustion chambers causes the working ends of the plurality of vanes to exert a rotational pressure on the rotor. The rotational pressure causes rotation of the rotor supporting the plurality of vanes and induces the retention ends of the plurality of vanes to revolve around the center of the rotor directed by the guiding means. The outer tips of the vanes do not contact an inner wall of the housing and so do not wear significantly after the initial break-in of the engine.

A plurality of combustion chambers are formed within the housing in the space between the inner wall of the housing and the rotor. The volume between two successive vanes, the inner wall of the housing, and a portion of the rotor define a combustion chamber therebetween.

Initial ignition at start-up is provided by a sparkplug. After this ignition is provided by the entry of ignited air and fuel mixture travelling through means for igniting a charge in at least one combustion chamber located between adjacent combustion chambers. As one combustion chamber is rotated through the power phase of the combustion cycle, the ignited air and fuel mixture rapidly expand. The expanding ignited gases travel through the igniting means formed in the housing comprising at least one of the walls of the combustion chamber. The expanding gasses travel to the area of less pressure located in the succeeding combustion chamber through the igniting means. The igniting means is positioned diagonally relative to the path of travel of the vanes causing the gases passing therethrough to form a vortex before entering the succeeding combustion chamber. This vortex continues as the ignited gases pass into the chamber and ignite the air and fuel mixture contained therein. The vortex action of the entering gases increases the effectiveness of the ignition by spreading the flame throughout the combustion chamber.

The action of the vortex also allows a variety of fuels to be burned in the engine. The introduction of a flame to the charge initiates rapid and thorough combustion, while simultaneously providing an ignition that produces less shock than a spark ignition with much less complexity. The igniting means operates efficiently at high engine speeds.

After the power phase, the combustion chamber is rotated past an exhaust port wherein the evacuation phase begins. At higher engine speeds, evacuation is not complete and a residual amount of still burning or unburned gas remains in the combustion chamber.

As the combustion chamber rotates beyond the exhaust port, the chamber is exposed to means for scavenging residual products of combustion from a combustion chamber. The scavenging means functions by positioning an exhaust venturi in communication with the exhaust system. The negative pressure developed by the venturi is communicated through an exhaust scavenging tube to an exhaust scavenging port. The negative pressure produced by the venturi tends to draw unburned gases from the combustion chamber out through the exhaust port and into the exhaust system. This supplemental exhaust system allows the engine to become more efficient at higher engine speeds by providing complete exhaust scavenging even at those higher speeds.

Means for utilizing centrifugal force to lubricate the friction surfaces of the engine are provided. Lubrication is circulated through the engine under pressure produced by the centrifugal force generated within a central connecting disk within the rotor. This pressure when combined with the revolving retention ends of the vanes causes lubricant to be circulated within the engine without the need for a lubricant pump to pressurize the lubricant. The lack of friction and the rotary nature of the engine contribute to the low vibration and shock levels within the engine.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings.

DETAILED DESCRIPTION OF THE PREFERRED EMBODIMENTS

Figure 1:
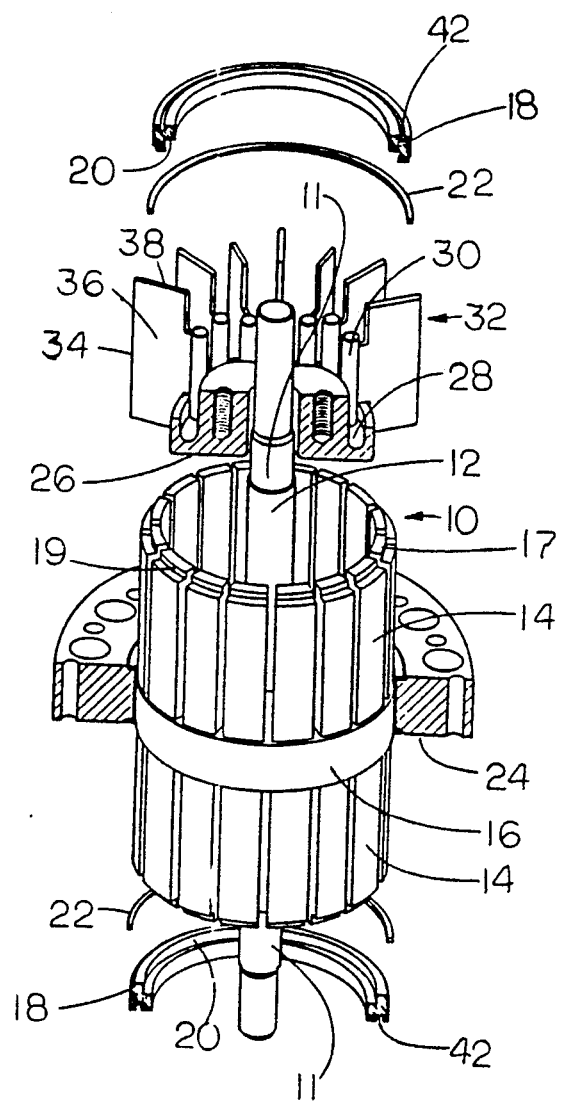
FIG. 1 is a perspective disassembled view impartial cross-section of the rotor and portions of the housing used in a preferred embodiment of the multiple vane rotary internal combustion engine.

FIG. 1 is a perspective view of a rotor 10 used in one preferred embodiment of a rotary engine embodying teachings of the present invention. A bearing end 11 is located at each end of a shaft 12 which delineates the longitudinal axis of rotor 10. A plurality of vane guides 14 form a generally cylindrical outer surface of rotor 10. Vane guides 14 are joined to shaft 12 by a central connecting disk 16.

During high engine speeds or revolutions per minute (RPM), centrifugal forces tend to deflect vane guides 28 out of their generally cylindrical shape. The ends 17 of vane guides 28 are unattached to central connecting disk 16 and are, therefore, more prone to deflection at high engine speeds than any other portion of vane guides 28. To prevent deflection of vane guides 14, an end ring 18 is attached to ends 17. End ring 18 is affixed to the plurality of vane guides 14 by heating end ring 18, sliding end ring 18 over the plurality of vane guides 14, and allowing end ring 18 to cool and shrink into locking engagement with vane guides 14.

To ensure a locking engagement, vane guides 14 have a beveled surface with increasing taper 19 of approximately two degrees which corresponds to a decreasing taper of the same degree on the inside interfacing surface 20 of end ring 18. A vane lubricant seal 22 prevents the passage of lubricant thereby. A central housing member 24 provides structural rigidity and support for both other housing members and for rotor 10.

An internal vane retention housing member 26 has formed within it a portion of a non-circular, internal vane retention track 28. Track 28 is capable of retaining a retention end 30 of each of a plurality of vanes 32. Vanes 32 revolve about the longitudinal axis of rotor 10 and are guided in that revolution by non-circular, internal vane retention track 28. Non-circular, internal vane retention track 28 is the only surface that experiences friction from continuous contact with vanes 32 after the initial break-in period of the engine. A vane tip 34 of a working end 36 of each of vanes 32 passes in close proximity to a wall of the combustion chamber, but experiences only incidental friction during normal operation of the engine. Likewise, a side 38 of each of vanes 32 does not normally contact the walls of the combustion chamber.

The friction caused by vanes 32 as they are rotated within the engine is greatly reduced relative to the friction developed in the other internal combustion engines discussed previously. Unlike the sprung rings of most reciprocating engine or the trochoidal rotors of some rotary engines, vane tips 34 are not in continuous contact with the walls of the combustion chamber. As the vanes are retained centrally in non-circular internal vane retention track 28, contact with the walls of the combustion chamber is not required to retain the vanes as they are rotated within an engine housing.

Furthermore, the friction that does occur within non-circular internal vane retention track 28 is reduced by the constant presence of lubricant within the track. In addition to retaining and guiding vanes 32 as they rotate within the engine, non-circular internal vane retention track 28 also functions as one of a plurality of internal lubricant passageways circulating lubricant throughout the engine. The rotation of vanes 32 through non-circular, internal vane retention track 28 aids in providing pressure in the circulation of the lubricant through the lubrication passageways within the engine.

With lubricant constantly surrounding retention ends 30, the friction developing between retention ends 30 and non-circular internal vane retention track 28 is kept to a minimum. The presence of lubricant also aids in reducing the heat present in the engine by absorbing the heat and carrying it outside of the engine as the lubricant circulates. An end ring lubricant seal groove 42 accepts a seal which prevents lubricant from leaving its designated passageways.

Figure 2:
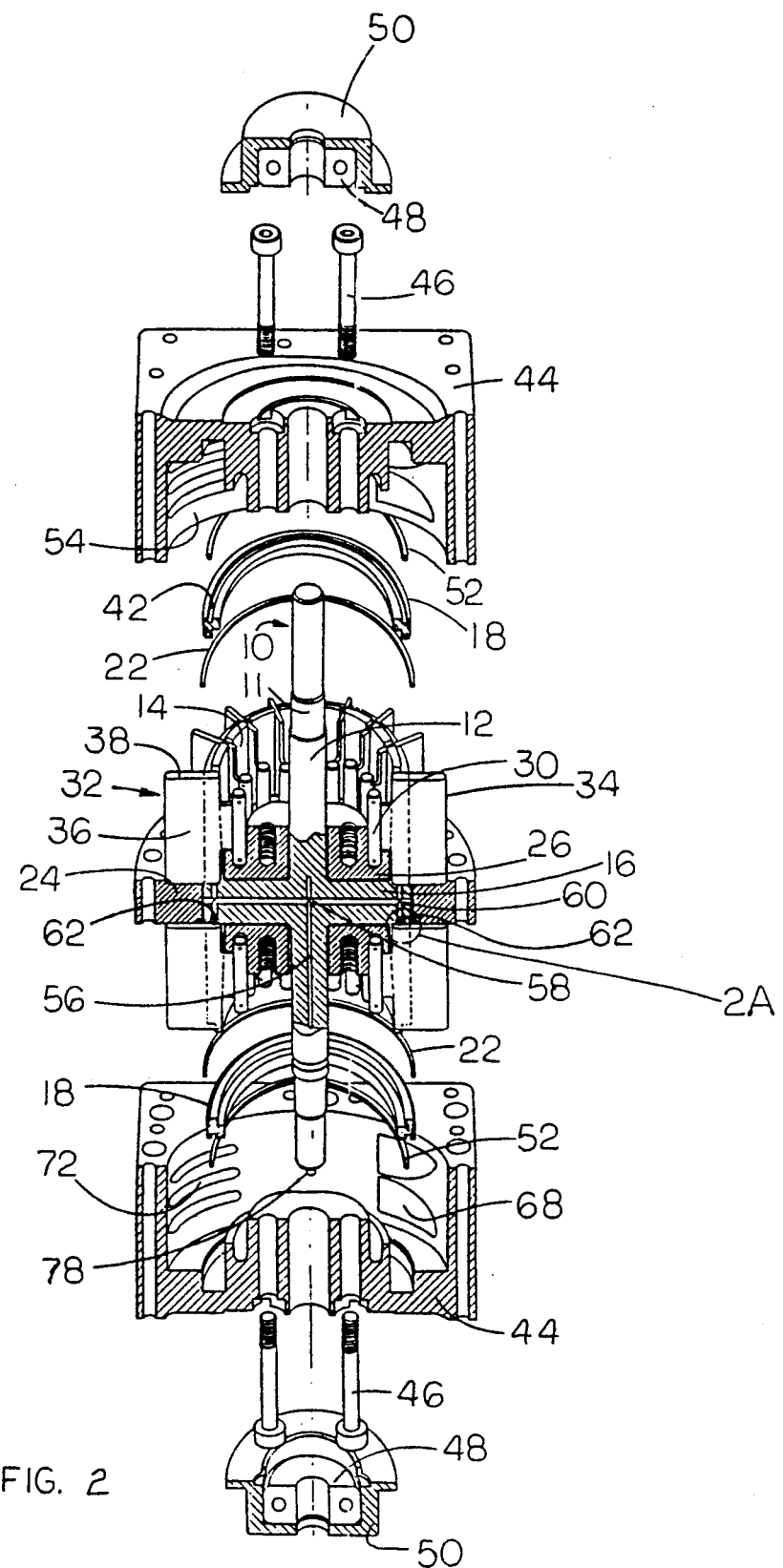
FIG. 2 is a cross-sectional perspective view of the rotor illustrated in FIG. 1, further depicting the working relationship of additional components of the multiple vane rotary internal combustion engine.
Figure 2A:
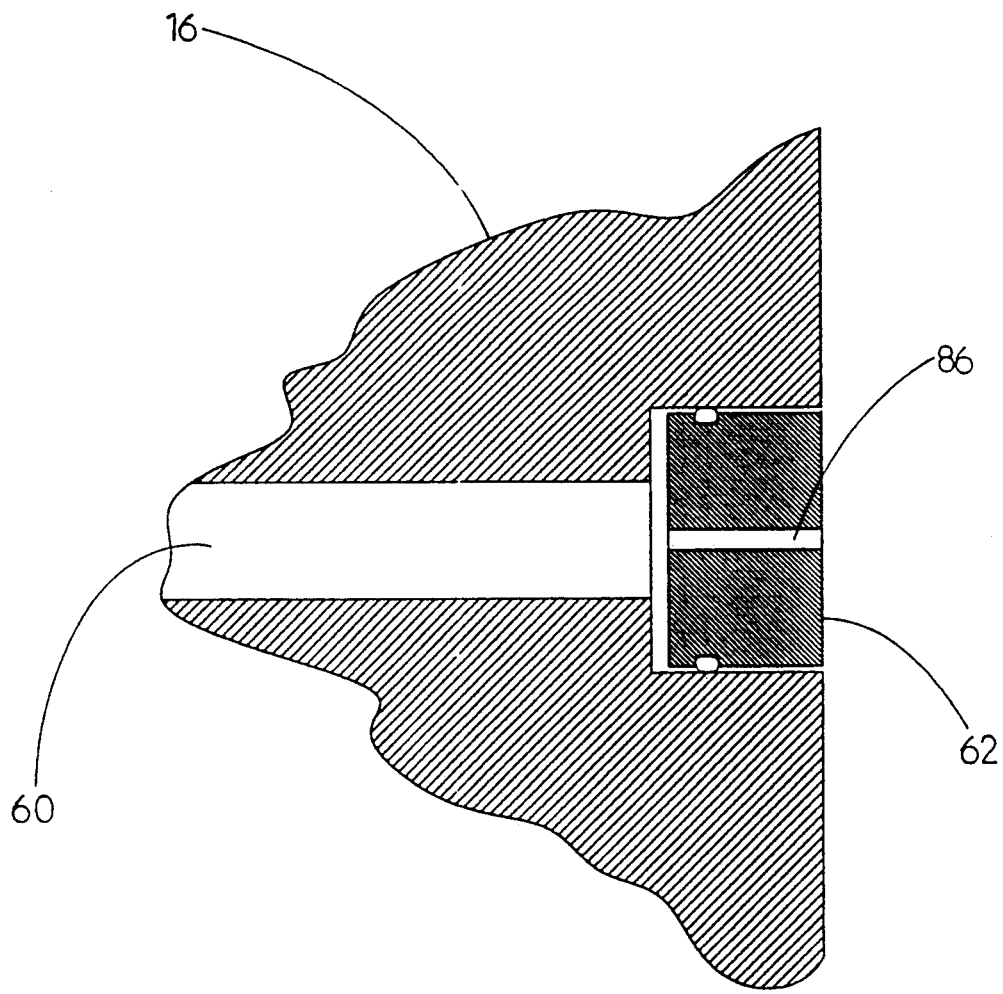
FIG. 2A is an enlarged view of the encircled area indicated in FIG. 2 further depicting the interaction of the lubricant plunger with the surrounding structures.

FIG. 2 illustrates a two-part outer housing member 44 that encircles vanes 32 and rotor 10. The two portions of outer housing member 44 join with central housing member 24 and internal vane retention housing member 26 to form the structural support housing for the engine. A plurality of bolts 46 join the housing members together. Rotor passes through outer housing member 44 and is supported therein by a rotor bearing 48 carried in an end cap 50.

Lubrication is provided at the interface of rotor 10 and central housing member 24 by a rotor lubricant passageway 56. Lubricant flows through lubricant passageway 56 to a radial lubricant junction 58 which disperses the lubricant through a plurality of radially extending passageways, each terminating in a secondary lubricant junction 60. Lubrication then is directed to the rotor-housing interface and to a plurality of vane lubricant plungers 62. An end ring lubricant seal 52 prevents lubricant flow between outer housing member 44 and end ring 18.

The plurality of vanes 32 are supported laterally by vane guides 14 as the vanes are rotated within outer housing member 44 in a clockwise direction. Vanes 32 are pivotally retained within non-circular, internal vane retention track 28 and are not, therefore, constrained from radial movement, but instead are allowed to pivot freely in a direction parallel to the direction of revolution of the vanes.

Because of the relationship between the non-circular internal vane retention track 28 and outer housing member 44, vanes 32 are required to assume orientations deviating from perpendicular to the longitudinal axis of rotor 10. Lateral movement is permitted by forming retention end 30 in a circular shape so that it may freely pivot while revolving around the cavity guided by retention track 28.

A perpendicular orientation must be maintained, however, between vane guides 14 and vanes 32 to prevent galling of an inner surface 54 of outer housing member 44. Inner surface 54, two vanes 32 and vane guide 14 define therebetween a combustion chamber. While three of the walls defining the combustion chamber rotate within outer housing member 44, inner surface 54 does not rotate and is stationary and so is constantly changing as the other three walls move relative to inner surface 54.

As retention ends 30 revolve within an elliptical cavity enclosed by the housing members, the distance between retention end 30 and vane guides 14 varies. This variation causes vanes 32 to slide within the slots formed between vane guides 14.

Figure 3:
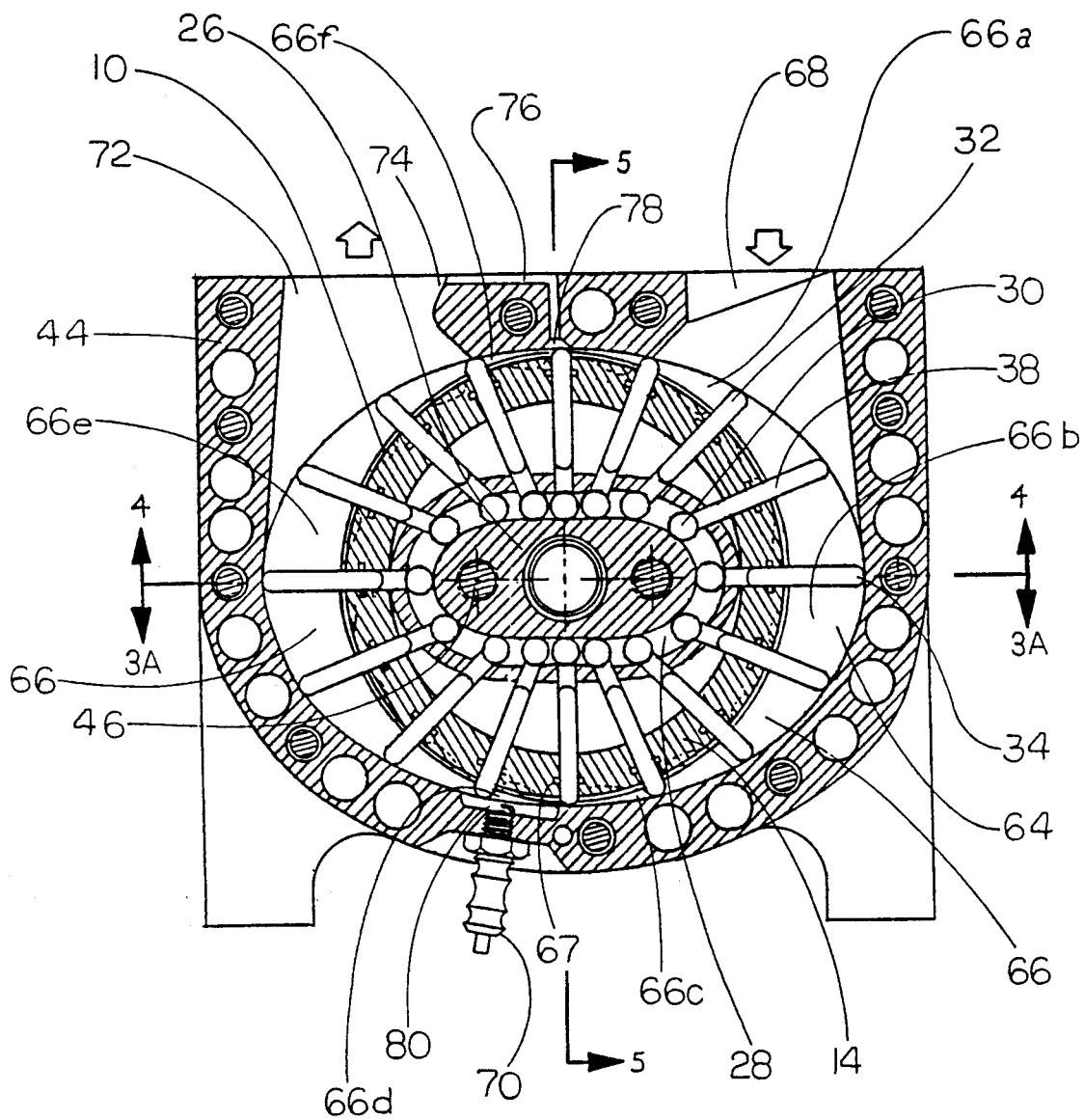
FIG. 3 is a cross-sectional elevation view of the embodiment illustrated in FIGS. 1 and 2.
Figure 3A:
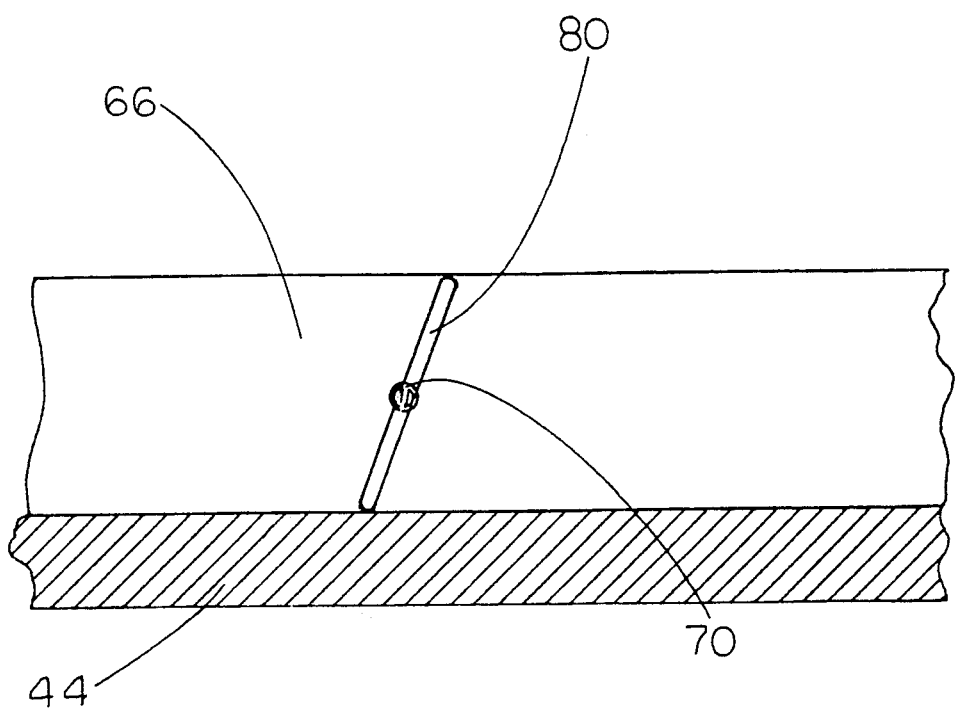
FIG. 3A is an enlarged view normal to the roof of the combustion chamber like that illustrated in FIG. 3 further depicting the orientation of the diagonal bleed-over groove.

FIG. 3 is a cross-sectional elevational view of a preferred embodiment illustrated in FIGS. 1 and 2, further illustrating the housing enclosing an elliptical cavity 64 through which the plurality of vanes 32 rotate. By way of example and not limitation, the housing illustrated in FIG. 3 is composed of three members, central housing member 24, not seen in this view, internal vane retention housing member 26, and outer housing member 44.

The housing members and other components of the engine can be formed from a variety of materials while still falling within the scope of this disclosure, high strength aluminum being used in the presently preferred embodiment.

Rotor 10 passes through at least one end of outer housing member 44 to transfer power generated within the engine to auxiliary devices located outside of the engine. Rotor 10 may also be used to power supplemental devices used in the operation of some embodiments of the inventive engine or for ancillary actuation of devices such as air conditioning, power steering, fuel pumps, etc. Rotor 10 penetrates outer rotor housing member 44 through rotor bearing 48 which is capable of supporting rotor 10 in outer housing member 44 while allowing rotational movement thereof.

The rotation of rotor 10 is initiated and maintained by the expansion of gases in one or more of a plurality of combustion chambers 66, two walls of which are defined by two vanes 32. Each of the plurality of vanes 32 has a retention end 30 and a working end 36. Working end 36 forms one wall of a combustion chamber and is slidably supported within one of the plurality of circumferentially spaced, radially extending slots formed between vane guides 14 of rotor 10.

According to one aspect of the present invention, a housing such as the housing illustrated in FIG. 3 is provided with means for guiding the plurality of vanes in a non-circular track. The vane guiding means are capable of retaining the retention ends of the plurality of vanes in a non-circular path of travel as combustion in the combustion chambers causes the working ends of the plurality of vanes to exert a rotational pressure on the rotor. This pressure causes rotation of the rotor supporting the plurality of vanes and induces the retention ends of the plurality of vanes to revolve around the center of the rotor.

By way of example and not limitation, the vane guiding means of the embodiment illustrated in FIG. 3 comprise a non-circular vane retention track 32 formed partially in portions of the internal vane retention housing member 26 and partially in portions of the outer housing member 44. The housing is held together, by way of example and not limitation by the plurality of bolts 46 capable of interconnecting the members of the housing around non-circular vane retention track 28, the connection of which may be better illustrated by reference to FIG. 2.

Referring again to FIG. 3, each non-circular vane retention track 28 encircles retention end 30 of each of the plurality of vanes 32 in one half of the engine. An identical non-circular vane retention track encircles retention end 30 of each of the plurality of vanes in the other half of the engine. When propelled by the expansion of gases in combustion chambers 66 of each half of the engine, the plurality of vanes 32 initiate rotation of rotor 10 about its longitudinal axis.

As rotor 10 rotates, vane guide 14 causes the working end 36 of vane 32 to revolve around the longitudinal axis of rotor 10. Retention end 30 of vane 32 is thereby pulled along with working end 36 in an orbit defined by a non-circular vane retention track 28. Vane retention track 28 guides the movement of retention end 30 through a predetermined path of travel along the track thereby regulating the distance between a tip 34 of vane 32 and inner surface 54 of outer housing member 44.

As the distance between vane retention track 28 and rotor 10 varies, vanes 32 slide between vane guides 14. Vane guide lubricant seals 67 scrape excess oil from vanes 32 to prevent oil from entering combustion chamber 66 as vanes 32 slide between vane guides 14.

The rotation of rotor 10 within elliptical cavity 64 in conjunction with movement of the plurality of retention ends 30 through vane retention track 28 causes combustion chambers 66 to vary in volume. Variation of the distance between the rotor surface and the inner surface of the rotor housing changes the volume of the combustion chambers. Combustion chambers 66 near the ends of the major axis of elliptical cavity 64 have more volume than the combustion chambers rotating through the area near the minor axis of the elliptical cavity 64.

These variations in chamber volume produce the phases of combustion necessary for operation of the engine. During the induction phase, air or an air and fuel mixture enter through an intake port 68 which is in communication with combustion chambers passing thereby.

In the view depicted in FIG. 3, rotor 10 rotates in a clockwise direction. At the position assumed by a combustion chamber 66a, the combustion chamber is increasing in volume as it is rotated by rotor 10 in a clockwise direction. This increase in volume creates a negative pressure causing the induction into combustion chamber 66a of the air, if fuel injection is used, or air and fuel mixture, if carburation is used.

The increase in volume in the combustion chamber in the position of combustion chamber 66a continues until the combustion chamber occupies the position assumed by a combustion chamber 66b. As vane 32 revolves past a position coincident with the major axis of the elliptical cavity 64, the combustion chamber formed forward of that vane begins to diminish in volume as rotation of rotor 10 continues in a clockwise direction.

A combustion chamber in the position of a combustion chamber 66c has a volume that is greatly reduced from that of a combustion chamber at position 66b. As the volume of combustion chamber 66 is reduced, the air and fuel mixture contained within the combustion chamber is compressed causing it to become heated. The compression of the air and fuel mixture in the combustion chamber ceases when the vane comprising a trailing wall of the combustion chamber approaches alignment with the minor axis of elliptical cavity 64.

During initial start-up, a sparkplug 70 is used to ignite the compressed air and fuel mixture in the combustion chamber when the combustion chamber is in the position occupied by a combustion chamber 66d.

As rotor 10 continues in a clockwise direction, the ignited gases within a combustion chamber in the position of combustion chamber 66d rapidly expand. The distance between rotor 10 and inner surface 54 during the period when the combustion chambers are in a position like that show by combustion chamber 66d, varies with the compression ratio desired and the size of the engine. This distance increases as the combustion chamber is rotated in a clockwise direction toward the major axis of the elliptical cavity 64.

As the majority of the volume of the combustion chamber is located near a leading vane of the chamber, the expansion of ignited gases within the combustion chamber tends to expand with more force against the leading vane of the chamber, thereby offsetting any force against the trailing vane of the chamber. The remaining walls of the combustion chamber, e.g. rotor 10 and inner surface 54 are not free to move. The expanding gases, therefore, propel the leading vane of the chamber. This tendency is further encouraged by the increasing volume of the chamber near the leading vane with continued rotation of the chamber. The movement of vane 32 in a clockwise direction forces vane guide 14 and rotor 10 to move which in turn rotates the combustion chambers not involved in the power phase of combustion.

During the power phase of the combustion cycle, the expanding gases within the combustion chamber force the vanes to be rotated in a clockwise direction. The expansion of gases continues until the combustion chamber is rotated into a position like that assumed by a combustion chamber 66e. Combustion chamber 66e is in communication with an exhaust port 72.

The expansion of combusting gases initiates the evacuation of combustion chamber 66e by allowing the expanding gases to follow the path of least resistance, which is out the exhaust port. At this point, the power phase is ended and the combustion chamber enters the exhaust phase of the combustion cycle.

As the combustion chamber in the position of combustion chamber 66e continues to be rotated in a clockwise direction, the volume within the combustion chamber decreases. This decrease in volume, mechanically forces the products of combustion to be exhausted from the combustion chamber. At this point, there exists a slight negative pressure within the combustion chamber. This slight negative pressure is caused by the expanding gases exiting rapidly into the exhaust port.

According to one aspect of the present invention, an exhaust port such as an exhaust port 46 illustrated in FIG. 3 is provided with means for scavenging residual products of combustion from the combustion chamber. By way of example and not limitation, the scavenging means of the embodiment illustrated in FIG. 3 comprise an exhaust venturi, an exhaust scavenging tube, and an exhaust scavenging port.

As the products of combustion exit the engine through exhaust port 72, the stream of expanding gases pass an exhaust venturi 74. The passage of the stream of gases causes a negative pressure to be developed at exhaust venturi 74. This negative pressure is communicated through an exhaust scavenging tube 76 to an exhaust scavenging port 78.

As the combustion chambers are rotated to a position like that assumed by a combustion chamber 66f, the combustion chamber moves into communication with exhaust scavenging port 78. The negative pressure being generated by exhaust venturi 74 is communicated to the contents of combustion chamber 66f. This negative pressure evacuates most of the remaining products of combustion from the combustion chamber through exhaust scavenging tube 76. This final scavenging marks the end of the exhaust phase of the combustion cycle.

As the combustion chamber continues to be rotated into communication with intake port 68, some negative pressure caused by the secondary evacuation by exhaust scavenging port 78 may remain in the combustion chamber. This negative pressure serves to accelerate the induction of a new charge of the air and fuel mixture in the initial portions of the induction phase to improve the efficiency of the engine.

Figure 4:
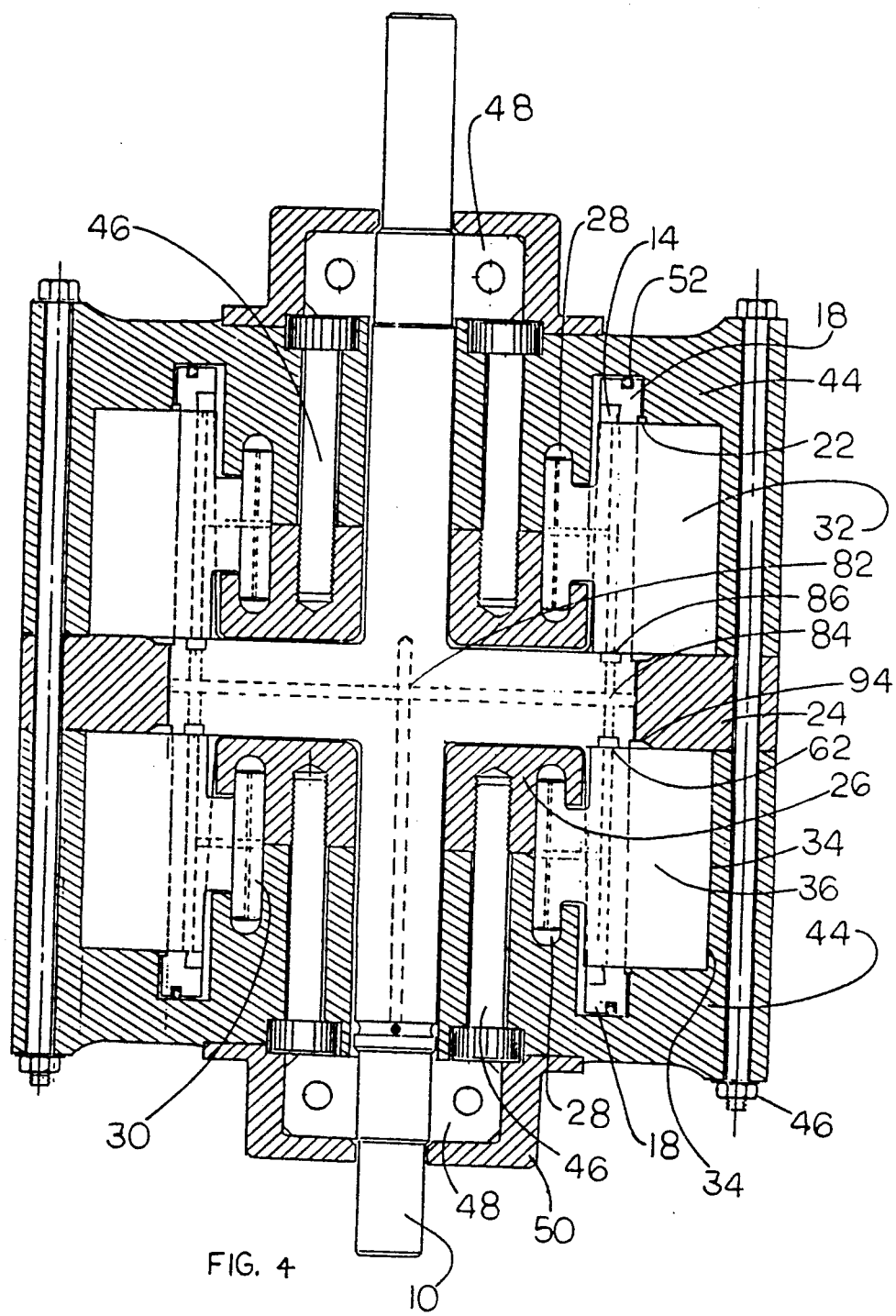
FIG. 4 is a cross-sectional plan view taken along lines 4—4 in FIG. 3, further illustrating the interrelationship of the parts of the multiple vane rotary internal combustion engine.

FIG. 4 is a cross-sectional plan view taken along lines 4—4 of the embodiment illustrated in FIG. 3 and more fully illustrates the two sets of vanes 32 that are rotated by vane guides 14 around the longitudinal axis of rotor 10. Vane retention track 28 is formed within portions of both internal vane retention housing member 26 and outer housing member 44 to retain retention end 30 of the plurality of vanes 32 as the vanes are rotated about rotor 10 by vane guides 14. The lubrication of the friction surfaces between retention end 28 of vane 32 and the outer wall of vane retention track 28 is provided by a lubricant pumped under pressure through rotor 10 to an axial dispersion point 82 located within central housing member 24. As vanes 32 circulate around retention track 28, the relative positions of the vanes and the rotor 10 are varied continuously. For example, the phantom line shown in FIG. 4 indicates a position wherein the vanes are in alignment with plunger 62; however, by referring to the embodiment depicted in FIG. 5, it may be seen that the vanes also occupy non-aligned positions. In the embodiment illustrated in FIG. 5, orifice 86 will be blocked by plunger 62 and no oil will flow therethrough. When vane 32 again approaches the position illustrated in FIG. 4, however, plunger 62 will be biased by a spring to extend slightly into the passage within the vane by extending from the detent position. This allows lubricant to course through the passage within the vane and into retention end 30 and vane retention track 28. Centrifugal force then directs the flow of lubricant into contact with the friction surfaces located therein. It will be understood by reference to, and comparison of, FIG. 4 and FIG. 5 that plunger 62 is in continuous contact with the side of vane 32 and is a detented position for much of the time. When aligned with the passageways inside the vane, however, plunger 62 assumes an extended position, thereby opening orifice 86 and allowing the flow of oil therethrough.

The pathway of lubricant travel splits into several pathways radially extending outward from axial dispersion point 82. The outwardly extending pathways have junctures at a plurality of secondary dispersion points 84 which direct lubricant flow to lubricant plungers 62. When vanes 32 are in the position illustrated in FIG. 4, lubricant plungers 62 are detented allowing the passage of lubricant to a vane lubricant orifice 86. As the vane slides within the slot formed between two successive vane guides to a position such as that illustrated in FIG. 5, the plunger reverts back to a detented position stopping the flow of oil through the vane.

Lubricant then flows through vane 32 and is directed through retention end 30 into vane retention track 28 where centrifugal force directs the flow of lubricant into contact with friction surfaces located therein. Vane lubricant seals 22 prevent the passage of lubricant into the combustion chambers 66.

The dashed lines across working end 36 illustrates the position of one vane guide 14. The inner edge of vane guide 14 is tapered toward the outer end of the vane guide. As the vane slides up and down within the slot between two successive vane guides, lubricant is scraped off the vane. This lubricant is then forced by the centrifugal action of the rotating vanes to follow the tapered surface of the vane guide to end ring 18 where the lubricant is channeled through an internal lubricant passageway.

A presently preferred embodiment illustrated in FIGS. 1-4 produces relatively little friction. This is because vane tip 34 does not contact inner surface 54. Likewise, the sides 38 of vane 32 do not directly contact the corresponding surfaces of inner surface 54 during normal operations. Some nominal contact may occur during the break-in process, however the contact between the sides of vane 32 and inner surface 54 is intermittent at most and does not contribute substantially to the friction produced in the engine during the break-in period. Thereafter, only incidental contact occurs.

The tolerance between the inner surface 54 and combustion chamber 66 at vane tip 34 and a vane side 38 decreases with increases in the temperature of the combustion chamber. At no temperature presently contemplated for operation of the engine, however, do the two surfaces continually contact each other after break-in conditioning of the engine.

Figure 5:
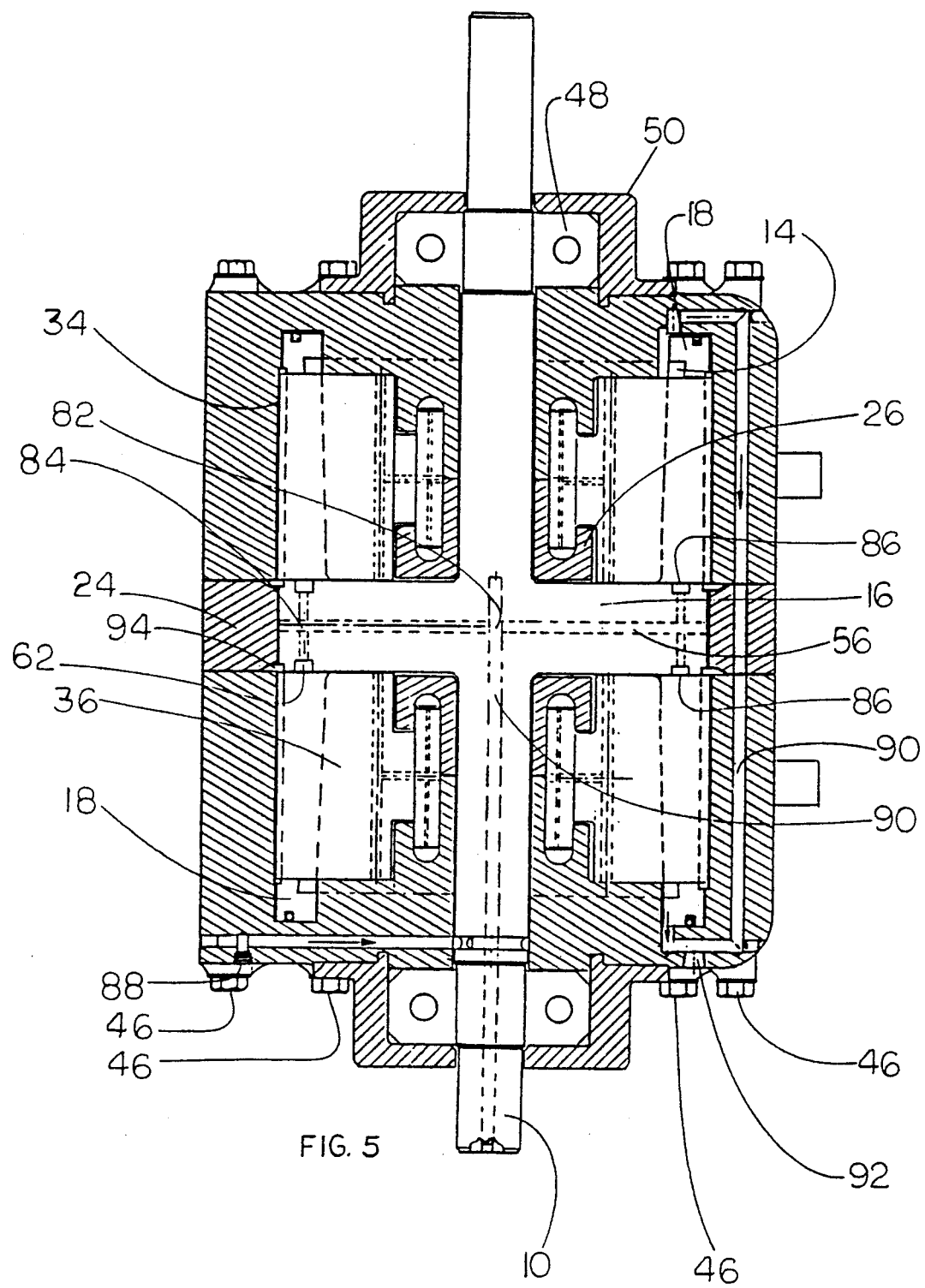
FIG. 5 is a cross-sectional side view taken along lines 5—5 in FIG. 3, illustrating additional components of the engine and their cooperative relationship to other components thereof.

As illustrated in FIG. 5, to further reduce the already low amount of friction occurring within the engine and according to one aspect of the present invention, component interfaces, such as those illustrated in FIG. 5 are provided with means for utilizing centrifugal force to lubricate the friction surfaces of the engine. This means is free from reliance on a lubricant pressurization pump.

By way of example and not limitation, the lubricating means of the embodiment illustrated in FIG. 5 comprise a lubricant inlet orifice 88, a plurality of internal lubricant passageways 90, lubricant plunger 62, axial dispersion point 82, secondary dispersion points 84, vane lubricant orifice 86, and a scavenging orifice 92.

When vanes 32 are in the position illustrated in FIG. 5, lubricant plungers 62 are not detented and no passage of lubricant occurs into the vanes illustrated. Lubricant enters the engine under pressure through lubricant inlet orifice 88 and travels through one of the plurality of internal lubricant passageways 90 to axial dispersion point 82. The lubricant is then directed radially to secondary dispersion point 84 and to lubricant plunger 62.

When the rotation of vane 32 brings the vane into a position such as that illustrated in FIG. 4, lubricant plunger 62 will be in a detent position and lubricant will flow into vane 32. After flowing through vane 32, the lubricant will flow into vane retention track 28 and be propelled by centrifugal force into end ring 18 and be stopped by end ring lubricant seal 52. As the vane continues to rotate, it will move into the position illustrated in FIG. 5. Lubricant leaving the end ring area will flow by end ring lubricant seals 52 and into one of the plurality of internal lubricant passageways 90 to scavenging orifice 92. From there, lubricant is carried back to a lubricant reservoir (not shown).

Unlike internal combustion engines that rely on a lubricant pressurization pump to provide the impetus for circulation of the lubricant throughout the engine, the present invention relies completely upon the centrifugal force developed as a result of the rotation of the vanes within the housing to pressurize the lubricant therein.

As the embodiment illustrated in FIG. 5 is operated, lubricant located within rotor lubricant passageway 56 is forced by centrifugal pressure into secondary dispersion with central housing member 24, and vane lubricant plungers 62. Lubricant flow is guided at this point by a rotor lubricant seal 94.

The passage of lubricant outward in the radially extending passageways emanating from axial dispersion point 82 causes a negative pressure to be developed within the closed lubricating system of the engine. This negative pressure compels lubricant located within the rotor in the passageway situated parallel to the longitudinal axis of the rotor to flow toward central connecting disk 16. This flow draws lubricant from a lubricant reservoir into the engine.

The pressure caused by the movement of lubricant within central connecting disk 16 forces lubricant into and through vanes 32. Lubricant then passes into vane retention track 28 and is further propelled by the action of the rotation of the retention ends 30 of the vanes traveling through the retention track. The lubricant is then forced through internal passageways to return to the reservoir through the scavenging orifice.

The delivery of lubricant to friction surfaces within the engine is accomplished solely through the use of the centrifugal force developed within the engine. Only centrifugal force and the pressure developed thereby are used to circulate the lubricant through the engine.

Figure 6:
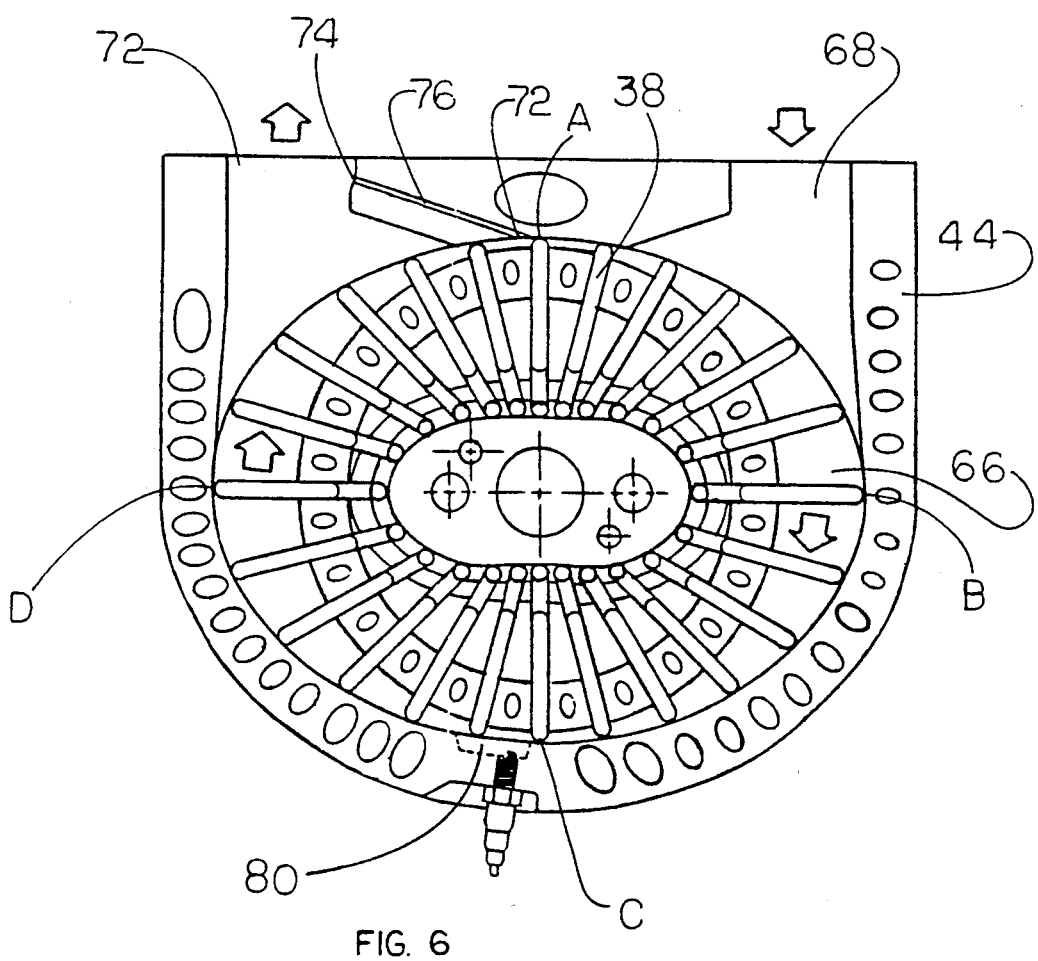
FIG. 6 is a depiction of the four phases of the combustion cycle employed by the embodiment illustrated in FIGS. 1-5, illustrating the location and relationship of each combustion phase to the components of the multiple vane rotary internal combustion engine.

FIG. 6 illustrates the phases of the combustion cycle as they relate to the structures of the presently preferred embodiment illustrated in FIGS. 1-5 and serves primarily as a contrast to the combustion cycle phases that will be discussed in connection with FIGS. 7-9.

Air or an air and fuel mixture enters outer housing member 44 through intake port 68. This air is drawn into housing 44 by the negative pressure created by the expansion of combustion chamber 66 as that chamber advances in a clockwise direction from the point labeled "A" to the point labeled "B." The volume of each combustion chamber 66 continually increases from point A to point B.

After passing point B, the volume of each combustion chamber 66 decreases, thereby compressing the charge located therein. The compression of the charge in combustion chamber 66 causes the charge to be heated. As combustion chamber 66 approaches the point labelled "C", a flame traveling through plasma bleed-over groove 80 ignites the charge. The charge immediately begins to combust and expand forcing the vane 32 nearest point "D" to move in a clockwise direction in a power phase. This force propels the remaining vanes as they rotate through the other stages of combustion and serves as the driving force to rotate rotor 10.

The rotation of rotor 10 allows the power generated during the power phase to be harnessed at the shaft end of the rotor. This power is then used to drive a transmission or other power transforming device for the intended use of the engine.

After passing point "D," combustion chamber 66 decreases in size, thereby expelling the products of combustion through exhaust port 72. The flow of spent combustion products past exhaust venturi 74 causes a negative pressure to be generated within exhaust scavenging tube 76. Exhaust scavenging tube 76 is in communication with exhaust scavenging port 78 which communicates the negative pressure to combustion chamber 66. The negative pressure evacuates any remaining products of combustion from combustion chamber 66 thereby increasing the effectiveness of the intake phase and the overall power output of the engine.

One power phase is completed in each combustion chamber for every rotation of the engine. In an elliptical embodiment of the present invention, by way of example, 16 power phases are completed every revolution of the crankshaft. A reciprocating piston internal combustion four-stroke engine produces a power phase in one combustion chamber every two revolutions of the crankshaft, thereby producing only one-half of the power phases per revolution of the vane-type rotary engine.

Figure 7:
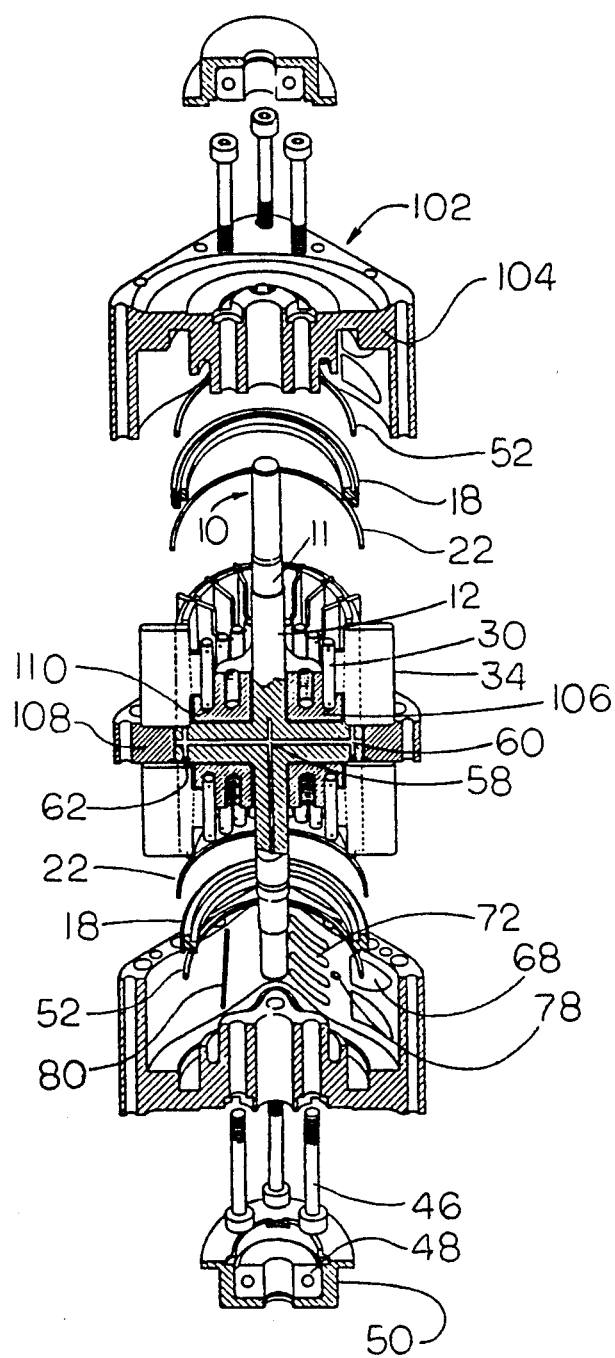
FIG. 7 is an exploded perspective view of the rotor and housing of another preferred embodiment of the multiple vane rotary internal combustion engine utilizing a quaternary housing.

FIG. 7 is an exploded cross-sectional view of another preferred embodiment of the present invention utilizing a quaternary shape for the chamber inside of the housing instead of the elliptical shape of the embodiment illustrated in FIGS. 1-6.

A housing 102 is comprised of an outer quaternary housing member 104, an internal non-circular vane retention housing member 106, and a central housing member 108. End caps 50 serve to house rotor bearing 48. Two housing members form an internal non-circular vane retention track, outer quaternary housing member 104 and internal non-circular vane retention housing member 108.

When a charged combustion chamber is rotated past sparkplug 70, the sparkplug discharges causing ignition of the products of combustion contained in the combustion chamber. After an initial few revolutions, however, ignition is no longer accomplished through the use of sparkplug 70. According to one aspect of the present invention, a housing such as the housing illustrated in FIG. 3 has means for igniting a charge in at least one of the plurality of combustion chambers.

By way of example and not limitation, the igniting means of the embodiment illustrated in FIG. 3 comprise a diagonal plasma bleed-over groove 80 formed within inner surface 54 in communication with at least two combustion chambers 66.

As the combustion chambers are rotated past sparkplug 70 during the initial rotation, the air and fuel charge is ignited by sparkplug 70 by igniting the air and fuel charge that flows within plasma bleed-over groove 80. This ignition rapidly travels to all of the air and fuel charge within the combustion chamber. The location of diagonal plasma bleed-over groove 80, however, allows the ignited gases from one combustion chamber to travel to the succeeding combustion chamber.

As ignition of the air and fuel charge travels from sparkplug 70 to all areas of the combustion chamber, the ignition also travels to all areas of the plasma bleed-over groove. The groove is in communication with more than one combustion chamber at any point in time, so the ignition travels along the diagonal plasma bleed-over groove into communication with the combustion chamber immediately preceding the combustion chamber in the position of combustion chamber 66d.

While passing through the diagonal plasma bleed-over groove, the ignited gases are formed into a vortex. This vortex exits diagonal plasma bleed-over groove 80 and continues as the gases enter the contiguous combustion chamber. The entry of the vortex of ignited gases into the combustion chamber causes rapid and complete combustion of the charge in the combustion chamber.

The vortex action increases the spread of the flame by simultaneously igniting the charge at several locations while churning the charge within the chamber. This dual action of churning and simultaneous ignition improves the combustion of the charge within the combustion chamber.

The ignition through plasma bleed-over groove 80 causes many benefits. For example, fuels that are not volatile enough to be ignited by a spark will ignite when in the presence of a flame.

Initial ignition may need to be supplemented with a mixture of a more volatile fuel to allow ignition by sparkplug 70, but ignition of all subsequent air and fuel charges may be accomplished through the use of the plasma bleed-over groove. Initiating ignition before a combustion chamber is in the position of combustion chamber 66d also allows for a more complete combustion before the gases are exhausted. This more complete combustion not only reduces polluting emissions, but also provides more power during the power phase of the combustion cycle.

Diagonal plasma bleed-over groove 80 is shown positioned within housing 102 at a location allowing passage of vanes 32 thereby. The diagonal nature of the groove allows vane tip 34 to contact only a portion of the bleed-over groove at any time. As the vane tip swipes across the bleed-over groove, a vortex is created. The pressure of expanding gases in a preceding combustion chamber forces the vortex through the bleed-over groove into a succeeding combustion chamber. With the exception of the housing members discussed immediately above, the majority of the remaining components are similar or perform nearly similar functions as performed in the discussion relating to FIGS. 1-6.

Figure 8:
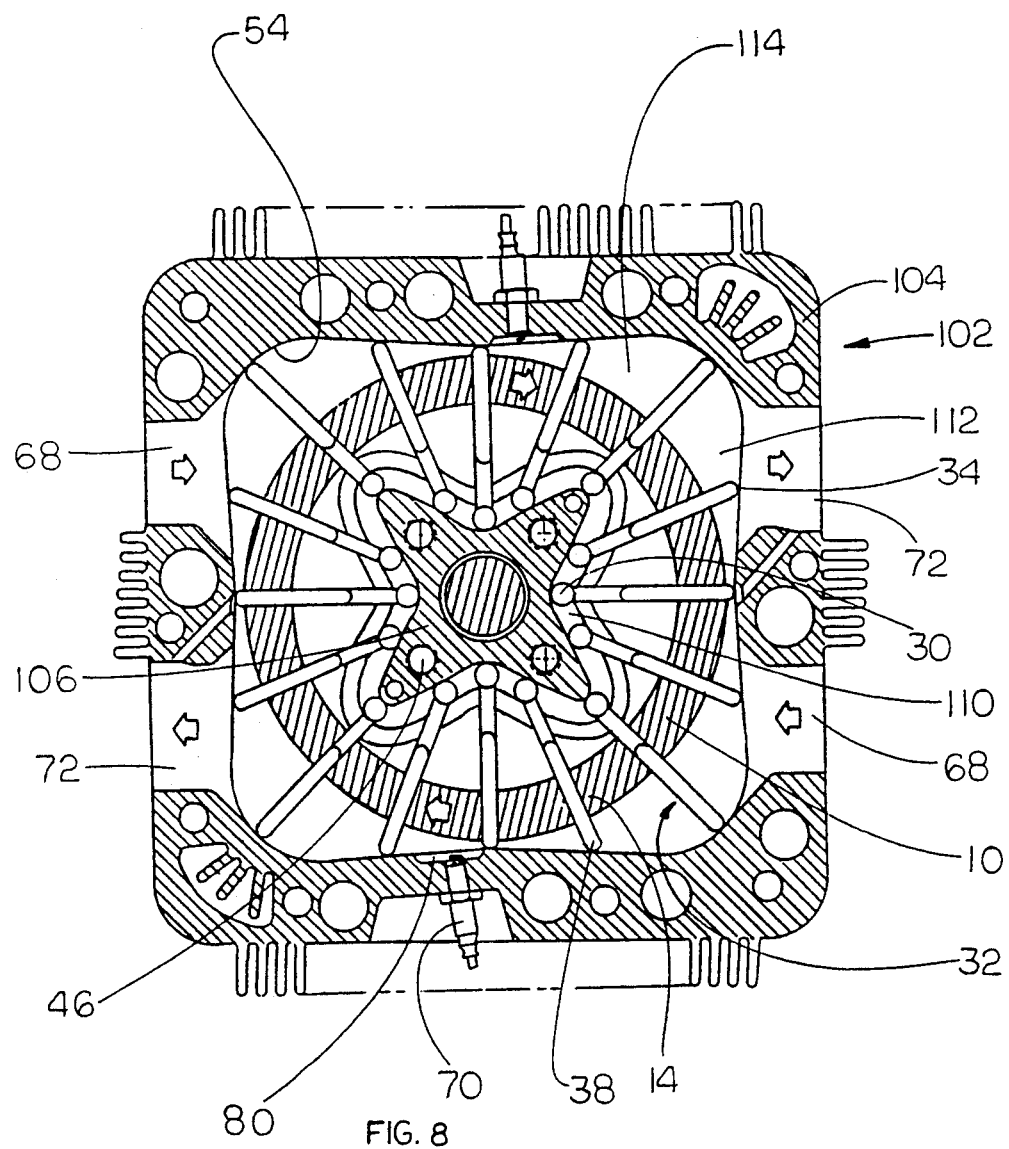
FIG. 8 is a cross-sectional end view of the embodiment illustrated in FIG. 7, utilizing a non-circular retaining track having a four-lobed configuration.

FIG. 8 is a cross-sectional end view of the embodiment illustrated in FIG. 7. An internal non-circular vane retention track 110 guides retention ends 30 of the plurality of vanes 32 as the vanes revolve around the interior of a quaternary chamber 112. To accommodate the quaternary structure of chamber 112, vane retention track 110 assumes a four-lobed shape to maintain a constant distance between tips 34 of vanes 32 and inner surface 54 forming the confines of a combustion chamber 114.

As with the elliptical embodiment previously discussed, the quaternary embodiment of the present invention has a rotor that is concentric with the cavity formed within the housing. The present invention does not utilize an eccentric rotor. Instead, the distance between the vane tip and the rotor housing is regulated by the shape of the non-circular vane retention track. The length of the vanes do not vary as the vanes revolve around the retention track.

Figure 9:
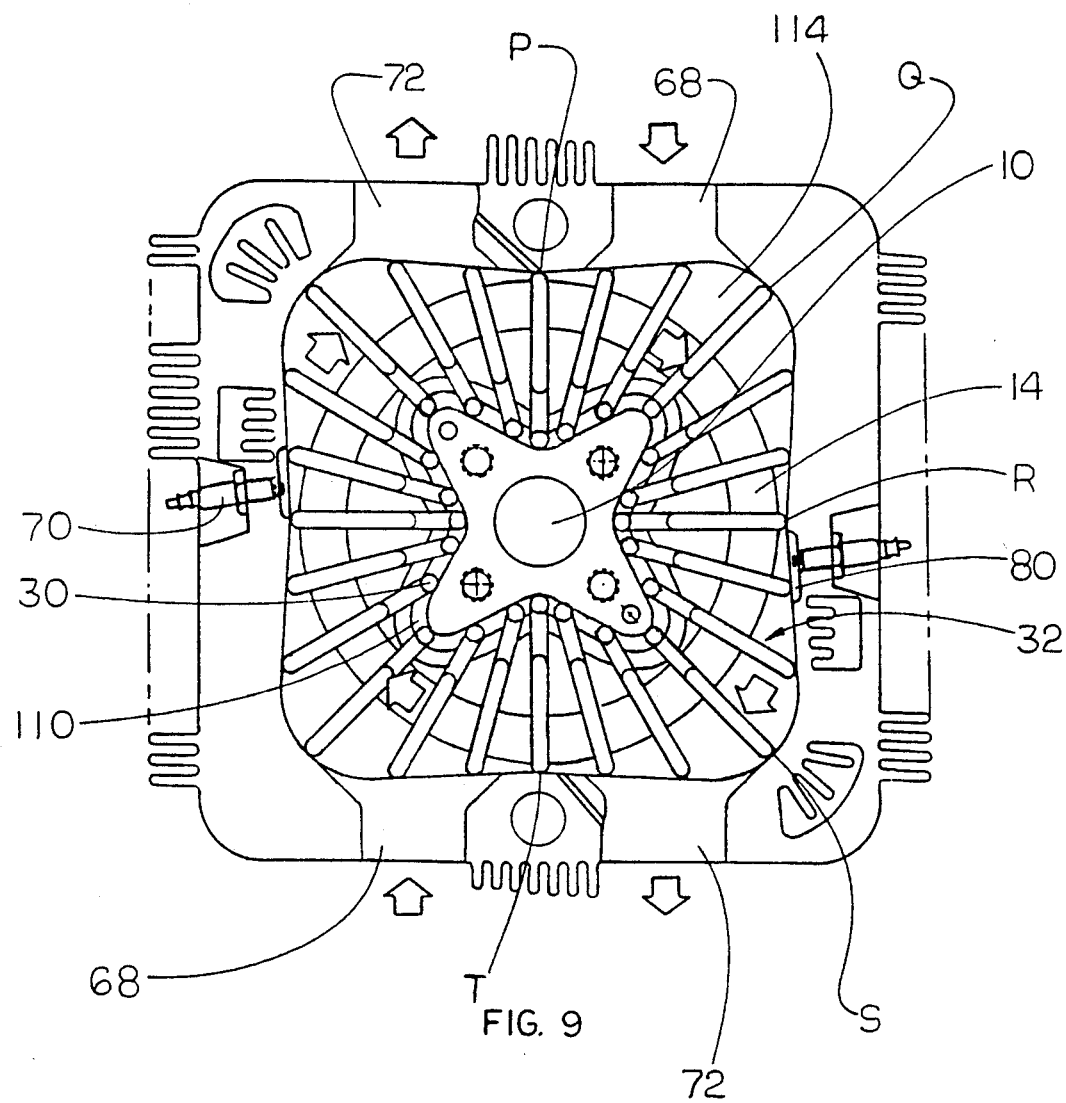
FIG. 9 is a depiction of the four phases of the combustion cycle employed by the embodiment illustrated in FIGS. 7 and 8, illustrating the location and relationship of each phase to the components of the multiple vane rotary internal combustion engine.

FIG. 9 illustrates the phases of the combustion cycle as they relate to the structures of the presently preferred embodiment illustrated in FIGS. 7 and 8 and serves primarily as a contrast to the combustion cycle phases discussed in connection with FIGS. 1-6.

One advantage derived from the quaternary form of the engine housing is that all combustion chambers complete all four phases of the combustion cycle two times per revolution of the motor for a total of two power phases in every combustion chamber per revolution. This is four times the power phase produced in each combustion chamber per revolution of a reciprocating piston internal combustion four-stroke engine of the type used in most automobiles.

This is accomplished by a decreasing the length of travel of combustion chamber 114 as it travels through the phases of combustion. As combustion chamber 114 passes across a point "P," the volume within the combustion chamber increases thereby inducing a negative pressure that acts to draw an air and fuel mixture into the combustion chamber through intake port 68. This charge is then compresses as the volume in combustion chamber 114 decreases during rotation between a point "Q" and a point "R."

The compressed charge is then ignited by a flame traveling through plasma bleed-over groove 80. Between point "R" and a point "S," the ignited charge expands in a power phases forcing vane 32 to rotate about the longitudinal axis of rotor 10. After passing point "S," the volume in the combustion chamber decreases and the products of combustion are expelled through exhaust port 72.

The phases of combustion are repeated twice per revolution of each set of vanes for a total of four power phases per revolution. This increase in the number of power phases greatly increases the power output of the engine giving the engine a large power to weight ratio.

Due to the light-weight materials utilized in the construction of the engine, the overall weight of the engine is low compared to other rotary engines and is significantly less that reciprocating piston engines. Light weight engines have traditionally produced more vibration and had stress-related problems because the their inability to absorb the impacts of repeated power phases within the engine. The present invention, however, does not suffer from these problems because of the frequency of the power phases per revolution. The high frequency of the power phases when combined with the natural advantages of a rotary arrangement combine to provide a smooth-running engine with a high power to weight ratio.

The rotary arrangement also allows fuels of higher volatility to be utilized. Because the plasma bleed-over groove ignites the fuel and air mixture by exposing it to a flame as the mixture is being compressed, the mixture begins combustion in a more thorough and explosive manner than it would if ignited with a spark after full compression. The compressed charge is exposed to the larger surface area of flame within the vortex as opposed to the area of flame produced around the spark plug. As a result, more volatile fuels than gasoline force the vanes to rotate at a higher rate instead of destroying the engine. Because of this advantage, a range of fuels can be combusted without harming the engine or without changing the compression ratio within the engine.

Also increasing the power output of the engine is the low amount of friction that occurs within the engine. Unlike Wankel engines, the present invention does not rely on continuous contact between the rotor lobe apex and the inner surface of the housing. A small gap exists between the vane tip and the inner surface thereby reducing the friction produced at that location in Wankel engines. Likewise, no friction occurs at the sides of the vane as does with piston rings in reciprocating engines. Friction occurs only within the internal non-circular vane retention track. The retention track, however, also serves as a lubricant passageway and so is constantly bathed in lubricant.

The present invention also derives benefits from the usage of the diagonal plasma bleed-over groove. At high engine speeds, the strength of the spark in most internal combustion engines is diminished causing incomplete combustion. Instead of bolstering the spark with complex and unreliable electrical systems, the present invention utilizes the simple mechanism of a groove formed with the housing capable of allowing the ignited expanding gases within one combustion chamber to travel to and ignite the compressed gases of a succeeding combustion chamber.

The diagonal placement of the plasma bleed-over groove imparts a vortex action to the gases passing therethrough. This vortex agitates and churns the compressed charge thereby providing for a more complete combustion of the charge. The vortex also spreads out the flame entering the chamber to simultaneously ignite the charge at several points. The rotary nature of the engine combined with the benefits of the plasma bleed-over groove, allow the present invention to utilize a variety of fuels such as hydrogen and other fuels more volatile than gasoline without undergoing any negative effects.

The products of combustion are discharged through the exhaust port as the combustion chamber decreases in volume. Any remaining products, however, are then evacuated through the secondary exhaust system. Negative pressure generated by a venturi withdraws the remaining products of combustion, thereby providing a combustion chamber that is not only evacuated, but also contains a negative pressure that aids in drawing in a fresh charge into the combustion chamber.

Unlike other exhaust systems, the benefits of the secondary exhaust system actually increase with engine speed. The exiting gases passing the venturi provide a stronger negative pressure with engine speed to more effectively remove the spent products of combustion.

The present invention does not rely on a lubricant pump to provide pressurized lubricant to the friction surfaces of the engine. Instead, the present invention harnesses the centrifugal force produced by the rotation of the rotor to provide pressure to the lubricant passing therethrough. This pressure causes lubricant not only to be circulated through points after the rotor, but also causes lubricant to be withdrawn from the reservoir by a siphon effect created by the passage of lubricant through the unvented lubrication system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. A multiple-vaned internal combustion rotary engine comprising:
   a) a housing enclosing a cavity, the housing have inner and outer wall surfaces;
   b) a rotor having a length and a circumference, the rotor being rotatably and concentrically mounted within the housing, the rotor passing through the cavity;
   c) a plurality of circumferentially-spaced vane guides forming slots therebetween in the rotor;
   d) a plurality of vanes having retention ends and working ends, each vane being slidably supported within a corresponding one of the slots with the working end directed radially outward toward the inner wall of the housing, the volume between two successive vanes and the inner wall defining a combustion chamber therebetween;

e) a diagonal plasma bleed-over groove capable of producing a vortex in gases passing therethrough;

f) an intake port and an exhaust scavenging port, formed in the housing;

g) means for scavenging residual products of combustion from the combustion chamber when the combustion chamber is rotated to a position free from direct communication with both the intake port and the exhaust port; and h) means for guiding the retention ends of the vanes in a non-circular continuously curving path of travel symmetrical about the longitudinal axis of the rotor, said means for guiding being housed within the volume defined by the length and circumference of the rotor.

2. A multiple-vaned internal combustion rotary engine as recited in claim 1, wherein the cavity has an elliptical shape.

3. A multiple-vaned internal combustion rotary engine as recited in claim 1, wherein the cavity has a quaternary shape.

4. A multiple-vaned internal combustion rotary engine as recited in claim 1, wherein the means for guiding the retention ends of the vanes in a non-circular continuously curving path of travel symmetrical about the longitudinal axis of the rotor comprise an internal, non-circular continuously curving vane retention track formed within the housing capable of pivotally retaining the retention ends of the vanes as the vanes revolve around the longitudinal axis of the rotor.

5. A multiple-vaned internal combustion rotary engine as recited in claim 1, wherein the means for scavenging residual products of combustion from the combustion chamber comprise:

a) an exhaust venturi positioned in communication with an exhaust system;

b) an exhaust scavenging port formed within the housing; and c) an exhaust scavenging tube capable of communicating negative pressure from the exhaust venturi to the exhaust scavenging port.

6. A multiple-vaned internal combustion rotary engine as recited in claim 1, further comprising means for utilizing centrifugal force generated within the rotor to pressurize a lubricant to lubricate the friction surfaces of the engine.

7. A multiple-vaned internal combustion rotary engine as recited in claim 6, wherein the means for utilizing centrifugal force to pressurize a lubricant to lubricate the friction surfaces of the engine comprise a plurality of internal lubricant passageways, one lubricant passageway passing within the rotor.

8. A multiple-vaned internal combustion rotary engine as recited in claim 7, wherein the means for utilizing centrifugal force to pressurize a lubricant to lubricate the friction surfaces of the engine further comprise:

a) a lubricant reservoir;

b) a lubricant inlet orifice capable of drawing lubricant from the reservoir into the engine; and c) a lubricant scavenging orifice capable of emitting lubricant from the engine into the reservoir.

9. A multiple-vaned internal combustion rotary engine comprising:

a) a housing enclosing a cavity, the housing having inner and outer wall surfaces;

b) a rotor rotatably mounted within the housing;

c) a plurality of circumferentially-spaced slots formed between vane guides in the rotor;

d) a plurality of vanes having retention ends and working ends, each vane slidably supported within one of the plurality of circumferentially-spaced slots, the area between two vanes and the inner wall defining a combustion chamber therebetween;

e) means for guiding the retention ends of the vanes in a non-circular continuously curving path of travel symmetrical about the longitudinal axis of the rotor;

f) means for igniting a charge in more than one combustion chamber; and g) means for scavenging residual products of combustion from the combustion chamber when the combustion chamber is rotated to a position free from direct communication with both the intake port and the exhaust port.

10. A multiple-vaned internal combustion rotary engine as recited in claim 9, further comprising means for utilizing centrifugal force to pressurize a lubricant to lubricate the friction surfaces of the engine.

11. A multiple-vaned internal combustion rotary engine as recited in claim 10, wherein the means for utilizing centrifugal force to pressurize a lubricant to lubricate the friction surfaces of the engine comprise a plurality of internal lubricant passageways, one lubricant passageway passing within the rotor.

12. A multiple-vaned internal combustion rotary engine as recited in claim 11, wherein the means for utilizing centrifugal force to pressurize a lubricant to lubricate the friction surfaces of the engine further comprise:

a) a lubricant reservoir;

b) a lubricant inlet orifice capable of drawing lubricant from the reservoir into the engine; and c) a lubricant scavenging orifice capable of emitting lubricant from the engine into the reservoir.

13. A multiple-vaned internal combustion rotary engine comprising:

a) a housing enclosing a cavity, the housing having inner and outer wall surfaces;

b) a rotor rotatably mounted within the housing;

c) a plurality of circumferentially spaced slots formed in the rotor;

d) a plurality of vanes having retention ends and working ends, each vane slidably supported within one of the plurality of circumferentially spaced slots, the area between two vanes and the inner wall defining a combustion chamber therebetween;

e) a vane retention track formed within the housing;

f) means for guiding the retention ends of the vanes in a non-circular path of travel;

g) a plurality of internal lubricant passageways, one lubricant passageway passing within the rotor thereby utilizing the centrifugal force generated within the rotor in combination with pressure generated within the vane retention track to provide pressure to a lubricant flowing therein;

h) means for utilizing centrifugal force generated within the rotor to pressurize a lubricant to lubricate the friction surfaces of the engine; and i) means for igniting a charge comprising a diagonal plasma bleed-over groove formed in the housing oriented diagonally to the vanes, the groove being capable of producing a vortex in the gases passing through the plasma bleed-over groove.

14. A multiple-vaned internal combustion rotary engine as recited in claim 13, wherein the means for utilizing centrifugal force generated within the rotor to pressurize a lubricant to lubricate the friction surfaces of the engine further comprise:
 a) a lubricant reservoir;
 b) a lubricant inlet orifice capable of drawing lubricant from the reservoir into the engine; and
 c) a lubricant scavenging orifice capable of emitting lubricant from the engine into the reservoir.

15. A multiple-vaned internal combustion rotary engine as recited in claim 13, wherein the engine further comprises means for scavenging residual products of combustion from the combustion chamber.

16. A multiple-vaned internal combustion rotary engine as recited in claim 15, wherein the means for scavenging residual products of combustion from the combustion chamber comprise:
 a) an exhaust venturi positioned in communication with an exhaust system;
 b) an exhaust scavenging port formed within the housing; and
 c) an exhaust scavenging tube capable of communicating negative pressure from the exhaust venturi to the exhaust scavenging port.

17. A multiple-vaned internal combustion rotary engine comprising:
 a) a housing enclosing a cavity, the housing having inner and outer wall surfaces;
 b) a rotor rotatably mounted within the housing;
 c) a plurality of circumferentially-spaced slots formed between vane guides in the rotor;
 d) a plurality of vanes having retention ends and working ends, each vane slidably supported within one of the plurality of circumferentially-spaced slots, the area between two vanes and the inner wall defining a combustion chamber therebetween;
 e) an internal, non-circular continuously curving vane retention track formed within the housing capable of pivotally retaining the retention ends of the vanes as the vanes revolve around the longitudinal axis of the rotor;
 f) a diagonal plasma bleed-over groove capable of producing a vortex in gases passing therethrough; and
 g) a plurality of internal lubricant passageways, one lubricant passageway passing within the rotor thereby utilizing the centrifugal force generated therein in combination with pressure generated within the vane retention track to provide pressure to a lubricant flowing therein.

* * * * *